US011425695B2

(12) United States Patent
Luo et al.

(10) Patent No.: US 11,425,695 B2
(45) Date of Patent: Aug. 23, 2022

(54) TRANSMISSION OF A COMMON CONTROL IN A BEAMFORMING SYSTEM

(71) Applicant: QUALCOMM Incorporated, San Diego, CA (US)

(72) Inventors: Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/983,683

(22) Filed: Aug. 3, 2020

(65) Prior Publication Data

US 2020/0367227 A1  Nov. 19, 2020

Related U.S. Application Data

(63) Continuation of application No. 15/641,918, filed on Jul. 5, 2017, now Pat. No. 10,736,082.

(60) Provisional application No. 62/415,081, filed on Oct. 31, 2016.

(51) Int. Cl.
*H04W 72/04* (2009.01)
*H04B 7/06* (2006.01)
*H04B 7/0413* (2017.01)
*H04L 41/0803* (2022.01)

(52) U.S. Cl.
CPC ...... *H04W 72/0406* (2013.01); *H04B 7/0413* (2013.01); *H04B 7/0617* (2013.01); *H04B 7/0695* (2013.01); *H04L 41/0803* (2013.01); *H04W 72/046* (2013.01); *H04W 72/0466* (2013.01); *H04W 72/0446* (2013.01)

(58) Field of Classification Search
CPC .. H04B 7/0408; H04B 7/0413; H04B 7/0617; H04B 7/0695; H04B 7/088; H04L 1/1607; H04L 1/1671; H04L 1/1829; H04L 41/0803; H04W 16/28; H04W 36/06; H04W 72/0406; H04W 72/046; H04W 72/0446; H04W 72/0466
See application file for complete search history.

(56) References Cited

U.S. PATENT DOCUMENTS 7,437,166 B2   10/2008   Osseiran et al.
8,009,617 B2   8/2011    Sarkar et al.
(Continued)

FOREIGN PATENT DOCUMENTS

CN   104885377 A   9/2015
CN   105379140 A   3/2016
(Continued)

OTHER PUBLICATIONS

Catt: "Principle of DL DCI Formats Design", 3GPP TSG RAN WG1 #86bis, R1-1608793, Lisbon, Portugal Oct. 10-14, 2016, pp. 1-3.
(Continued)

*Primary Examiner* — Eric Nowlin
(74) *Attorney, Agent, or Firm* — Qualcomm Incorporated

(57) ABSTRACT

Aspects of the present disclosure provide techniques for informing devices of the use of transmit and receive beams in a beamforming communication system. An exemplary method includes determining a plurality of beam directions for a device to use in different transmission time intervals (TTIs) of a TTI burst, and sending a directional transmission to the device indicating at least one of the beam directions.

30 Claims, 15 Drawing Sheets

(56) References Cited

U.S. PATENT DOCUMENTS

| | | | |
|---|---|---|---|
| 8,135,439 B2* | 3/2012 | Hagerman | H04W 52/346 |
| | | | 455/562.1 |
| 8,547,918 B2* | 10/2013 | Brueck | H04B 7/0632 |
| | | | 370/329 |
| 9,031,028 B2 | 5/2015 | Kim et al. | |
| 9,408,220 B2 | 8/2016 | Gore et al. | |
| 9,426,766 B2 | 8/2016 | Jung et al. | |
| 9,674,829 B2 | 6/2017 | Kim et al. | |
| 9,985,705 B2 | 5/2018 | Kim et al. | |
| 10,097,255 B2 | 10/2018 | Cezanne et al. | |
| 10,172,128 B2 | 1/2019 | Kim et al. | |
| 10,225,867 B2* | 3/2019 | Nagaraja | H04W 74/0833 |
| 10,425,968 B2 | 9/2019 | Qian et al. | |
| 10,560,229 B2* | 2/2020 | Xiong | H04L 5/0055 |
| 10,560,926 B2 | 2/2020 | Luo et al. | |
| 10,582,397 B2 | 3/2020 | Sun et al. | |
| 10,721,036 B2* | 7/2020 | Yi | H04W 72/0446 |
| 10,973,072 B2* | 4/2021 | Kang | H04L 1/1867 |
| 2005/0064872 A1 | 3/2005 | Osseiran et al. | |
| 2006/0098580 A1 | 5/2006 | Li et al. | |
| 2008/0002733 A1 | 1/2008 | Sutskover | |
| 2009/0258654 A1* | 10/2009 | Hagerman | H04W 52/346 |
| | | | 455/452.1 |
| 2010/0014463 A1 | 1/2010 | Nagai et al. | |
| 2011/0280197 A1* | 11/2011 | Brueck | H04B 7/0452 |
| | | | 370/329 |
| 2013/0231059 A1 | 9/2013 | Prasad et al. | |
| 2013/0301597 A1 | 11/2013 | Kim et al. | |
| 2014/0177561 A1 | 6/2014 | Yu et al. | |
| 2015/0004918 A1 | 1/2015 | Wang et al. | |
| 2015/0009984 A1 | 1/2015 | Jung et al. | |
| 2015/0223215 A1 | 8/2015 | Kim et al. | |
| 2015/0289147 A1 | 10/2015 | Lou et al. | |
| 2016/0044517 A1 | 2/2016 | Raghavan et al. | |
| 2016/0095003 A1 | 3/2016 | Yu et al. | |
| 2016/0174208 A1 | 6/2016 | Kim et al. | |
| 2016/0174244 A1 | 6/2016 | Kim et al. | |
| 2016/0211899 A1 | 7/2016 | Yang et al. | |
| 2016/0323028 A1 | 11/2016 | Cheng et al. | |
| 2017/0005715 A1 | 1/2017 | Cezanne et al. | |
| 2017/0033912 A1 | 2/2017 | Onggosanusi et al. | |
| 2017/0034812 A1 | 2/2017 | Deng et al. | |
| 2017/0111886 A1* | 4/2017 | Kim | H04W 48/14 |
| 2017/0251457 A1 | 8/2017 | Kim et al. | |
| 2017/0273058 A1 | 9/2017 | Agiwal et al. | |
| 2017/0339675 A1 | 11/2017 | Liu et al. | |
| 2018/0048358 A1 | 2/2018 | Li et al. | |
| 2018/0063828 A1 | 3/2018 | Wang et al. | |
| 2018/0070380 A1* | 3/2018 | Nagaraja | H04B 7/0695 |
| 2018/0077680 A1 | 3/2018 | Tenny et al. | |
| 2018/0077702 A1 | 3/2018 | McLellan et al. | |
| 2018/0123673 A1 | 5/2018 | Kim et al. | |
| 2018/0124765 A1 | 5/2018 | Luo et al. | |
| 2018/0132114 A1 | 5/2018 | Sun et al. | |
| 2018/0139014 A1* | 5/2018 | Xiong | H04L 5/0091 |
| 2018/0139773 A1 | 5/2018 | Ma et al. | |
| 2018/0146474 A1 | 5/2018 | Luo et al. | |
| 2018/0176896 A1 | 6/2018 | Petersson et al. | |
| 2018/0205420 A1 | 7/2018 | Petersson et al. | |
| 2018/0206170 A1 | 7/2018 | Nagaraja et al. | |
| 2018/0212653 A1 | 7/2018 | Miao et al. | |
| 2018/0219604 A1 | 8/2018 | Lu et al. | |
| 2018/0294859 A1* | 10/2018 | Niu | H04W 36/0022 |
| 2018/0310283 A1 | 10/2018 | Deenoo et al. | |
| 2018/0343681 A1* | 11/2018 | Nagaraja | H04W 74/0833 |
| 2019/0052337 A1 | 2/2019 | Kwon et al. | |
| 2019/0053153 A1 | 2/2019 | Islam et al. | |
| 2019/0116007 A1* | 4/2019 | Yi | H04W 56/00 |
| 2019/0149217 A1 | 5/2019 | Yang et al. | |
| 2019/0223247 A1* | 7/2019 | Kang | H04L 5/0055 |
| 2019/0239131 A1 | 8/2019 | Yang et al. | |
| 2019/0253116 A1 | 8/2019 | Priyanto et al. | |
| 2020/0028599 A1 | 1/2020 | Zhang et al. | |
| 2020/0052770 A1 | 2/2020 | Chen et al. | |
| 2020/0053672 A1 | 2/2020 | Tang et al. | |
| 2020/0059286 A1 | 2/2020 | Xiong et al. | |
| 2020/0059290 A1 | 2/2020 | Pan et al. | |

FOREIGN PATENT DOCUMENTS

| | | | | |
|---|---|---|---|---|
| CN | 105850224 A | | 8/2016 | |
| CN | 107079459 A | | 8/2017 | |
| CN | 107666379 A | * | 2/2018 | ............ H04L 5/001 |
| CN | 107925535 A | * | 4/2018 | ........... H04B 7/0617 |
| CN | 108141299 A | * | 6/2018 | .......... H04J 11/0069 |
| CN | 108141299 B | * | 11/2019 | .......... H04J 11/0069 |
| CN | 110730489 A | * | 1/2020 | .......... H04J 11/0069 |
| CN | 107925535 B | * | 4/2021 | ........... H04B 7/0617 |
| CN | 110730489 B | * | 11/2021 | .......... H04J 11/0069 |
| EP | 0841827 A2 | | 5/1998 | |
| EP | 3335494 A1 | | 6/2018 | |
| EP | 3335494 A4 | | 8/2018 | |
| EP | 3363130 B1 | * | 3/2021 | .......... H04J 11/0069 |
| EP | 3849113 A1 | * | 7/2021 | .......... H04J 11/0069 |
| KR | 20180056771 A | * | 10/2016 | |
| TW | 201724889 A | * | 7/2017 | ........... H04B 7/0617 |
| WO | 2009023863 | | 2/2009 | |
| WO | 2015157565 A1 | | 10/2015 | |
| WO | 2016069141 A1 | | 5/2016 | |
| WO | 2016073039 A1 | | 5/2016 | |
| WO | 2016122845 A1 | | 8/2016 | |
| WO | 2017024516 A1 | | 2/2017 | |
| WO | WO-2017062050 A1 | * | 4/2017 | ........... H04B 7/0617 |
| WO | WO-2017065548 A1 | * | 4/2017 | .......... H04J 11/0069 |
| WO | 2018136185 A1 | | 7/2018 | |

OTHER PUBLICATIONS

Huawei et al., "Discussion on Downlink Control Channel Design", 3GPP Draft; R1-1609432, 3GPP TSG-RAN WG1#86b, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 9, 2016, XP051149475, Retrieved from the Internet: URL:http://www.3gpp.org/ftp/tsg_ran/WG1_RL1/TSGR1_86b/Docs/R1-1609432.zip [retrieved on Oct. 9, 2016], 5 pages.

Huawei et al., "Discussion on Time Domain Structures", 3GPP TSG RAN WG1 Meeting #86bis, R1-1608836, Lisbon, Portugal, Oct. 10-14, 2016, 4 Pages, Retrieved from the Internet: http://www.3gpp.org/ftp/tsg_ran/WG1_RL1/TSGR1_86b/Docs/R1-1608836.zip.

International Preliminary Report on Patentability—PCT/US2017/055745, The International Bureau of WIPO—Geneva, Switzerland, Apr. 30, 2019.

International Search Report and Written Opinion—PCT/US2017/055745—ISA/EPO—dated Jan. 19, 2018.

* cited by examiner

TRANSMISSION OF A COMMON CONTROL IN A BEAMFORMING SYSTEM

CROSS-REFERENCE TO RELATED APPLICATIONS

This application is a continuation of U.S. application Ser. No. 15/641,918, filed Jul. 5, 2017, which claims benefit of and priority to U.S. Provisional Application No. 62/415,081, filed Oct. 31, 2016, which is assigned to the assignee of the present application and hereby expressly incorporated by reference herein in its entirety.

BACKGROUND

Field of the Disclosure

Aspects of the present disclosure relate to wireless communications and, more particularly, to informing devices of the use of transmit and receive beams in a beamforming communication system.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrate with other open standards using OFDMA with a cyclic prefix (CP) on the downlink (DL) and on the uplink (UL). In addition, NR supports beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for indicating beams to be used during a burst of transmission time intervals (TTIs) in a wireless communications system using beamforming are described herein.

In an aspect, a method for wireless communication is provided. The method may be performed, for example, by an apparatus. The method generally includes determining a plurality of beam directions for a device to use in different transmission time intervals (TTIs) of a TTI burst, and sending a directional transmission to the device indicating at least one of the beam directions.

In an aspect, a method for wireless communication is provided. The method may be performed, for example, by an apparatus. The method generally includes determining a plurality of beam directions for a device to use in different transmission time intervals (TTIs) of a TTI burst, determining, based at least on arrival of traffic for the device, whether to send the traffic to the device via a beam direction in the TTI burst, and sending a directional transmission to the device indicating at least one of the beam directions, if the determination was to send the traffic to the device via the beam direction.

In an aspect, a method for wireless communication is provided. The method may be performed, for example, by an apparatus. The method generally includes attempting to decode, in a control symbol, a directional transmission, from a device, indicating at least one beam direction for the apparatus to use in different transmission time intervals (TTIs) of a TTI burst, and determining, if the directional transmission is decoded, not to monitor one or more TTIs of the TTI burst based on information in the directional transmission.

In an aspect, an apparatus for wireless communication is provided. The apparatus generally includes a processing system configured to determine a plurality of beam directions for a device to use in different transmission time intervals (TTIs) of a TTI burst and to send a directional transmission to the device indicating at least one of the beam directions, and a memory coupled with the processing system.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
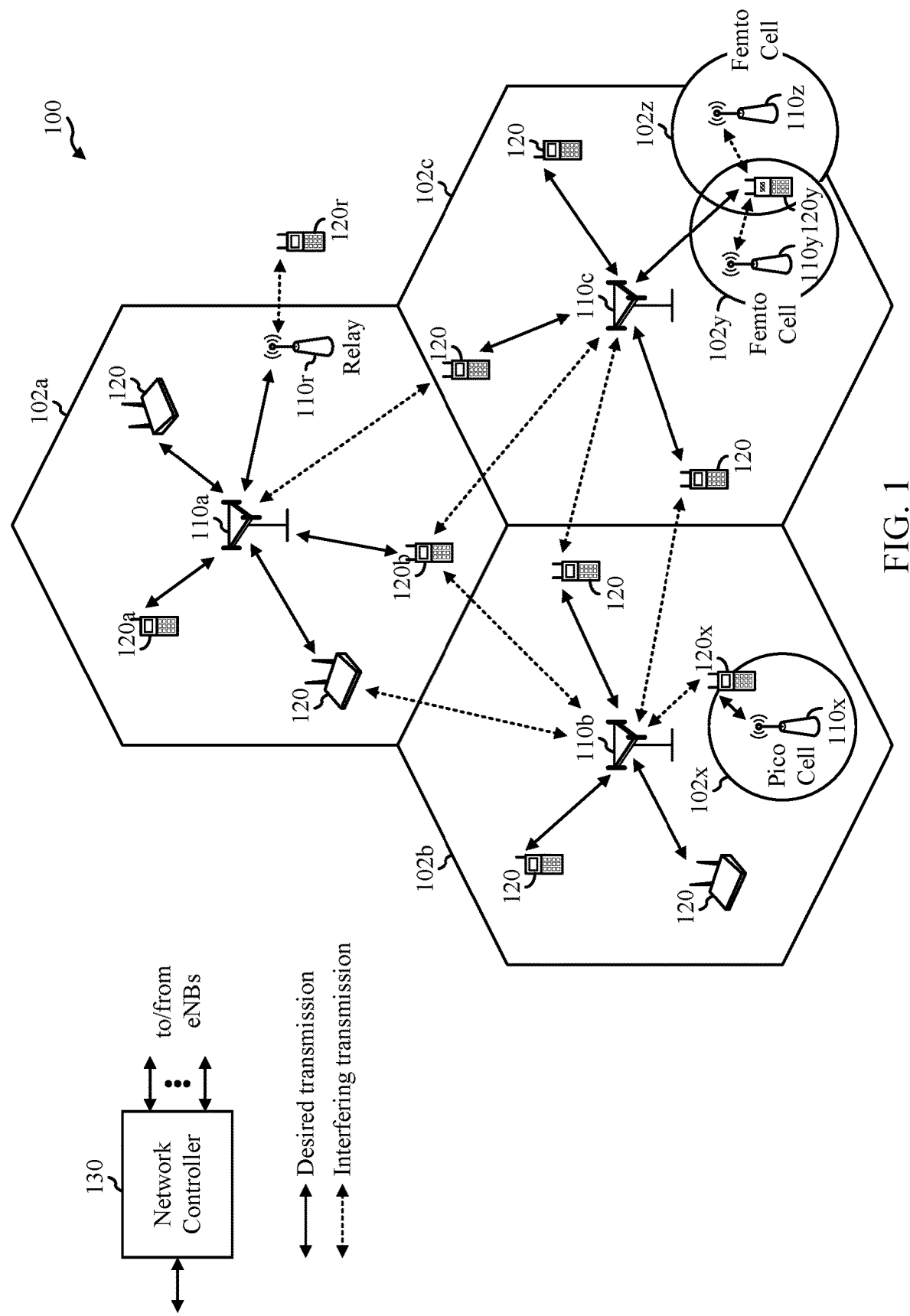
FIG. 1 is a block diagram conceptually illustrating an example telecommunications system, according to aspects of the present disclosure.

Aspects of the present disclosure provide apparatus, methods, processing systems, and computer readable mediums for indicating beams to be used during a burst of transmission time intervals (TTIs) in a wireless communications system using beamforming.

Aspects of the present disclosure provide techniques for an apparatus to signal indications of one or more beams that the apparatus may use for transmitting or receiving communications from other devices during a TTI burst. For example, a BS may determine a set of beams that the BS will use during a burst of subframes. The BS may transmit one or more indications of the beams in control symbols of the burst. According to aspects of the present disclosure, one or more UEs may determine to monitor for communications from the BS when the indication(s) indicate a transmit beam that is aimed at the UE and determine to transmit to the BS when the indication(s) indicate that the BS is using a receive beam aimed at the UE.

As described herein, a numerology of a wireless communications system may be based, at least in part, on a subcarrier or tone spacing, a shift in frequency, and/or cyclic prefix (CP). Accordingly, a BS and UE in a heterogeneous numerology system may communicate using tones determined based on a numerology. Additionally or alternatively, the BS and UE may communicate using an RB defined using a numerology.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be a new radio (NR) or a 5G network.

According to aspects, the wireless network 100 may be a heterogeneous numerology system, wherein UEs 120 within the network 100 may be asynchronous, have different inter-carrier spacing, and/or have different cyclic prefix lengths. According to aspects a BS, such as BS 110a may support different services having different service requirements. For example, the BS 110a may support subframe with different subcarrier spacing. The BS 110a may communicate with UE 120a using a first subcarrier spacing and may communicate with UE 120b using a second subcarrier spacing. UEs 120a, 120b may be configured to operate according to one or more numerologies. In the manner a network may support subframes with different subcarrier spacings.

According to aspects, the subcarrier spacing associated with the different service requirements may be scaled. As a non-limiting example, for illustrative purposes only, the subcarrier spacing may be 15 kHz, 30 kHz, 60 kHz, 120 kHz, and so on (e.g., ×1, ×2, ×4, ×8, and so on . . . ). According to another example, the subcarrier spacing may be 17.5 kHz, 35 kHz, and so on (e.g., ×1, ×2, ×3, ×4, and so on). Aspects described herein provide methods for tone allocation and resource block definition for heterogeneous numerology systems, which may be beneficial for scheduling devices and communicating with one or more devices in heterogeneous numerology systems.

As described herein, a numerology may be based, at least in part, on a subcarrier spacing and a shift in frequency. The BS 110a and UE 120a may communicate using tones determined using a numerology. Additionally or alternatively, the BS 110a and 120a may communicate using an RB defined using a numerology.

Figure 14:
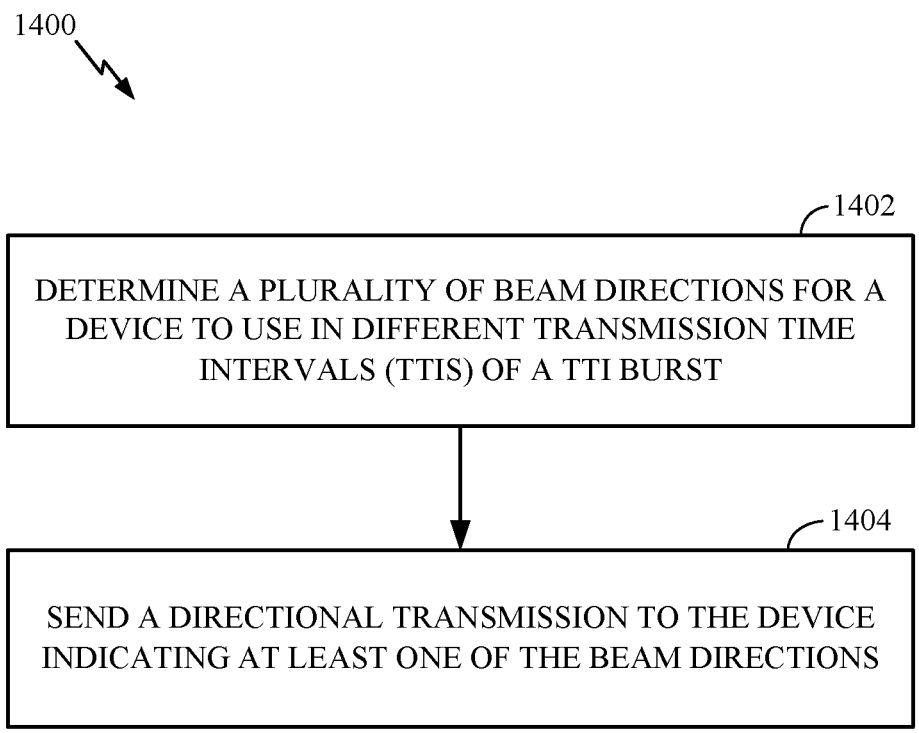
FIG. 14 illustrates example operations that may be performed by an apparatus, according to aspects of the present disclosure.
Figure 15:
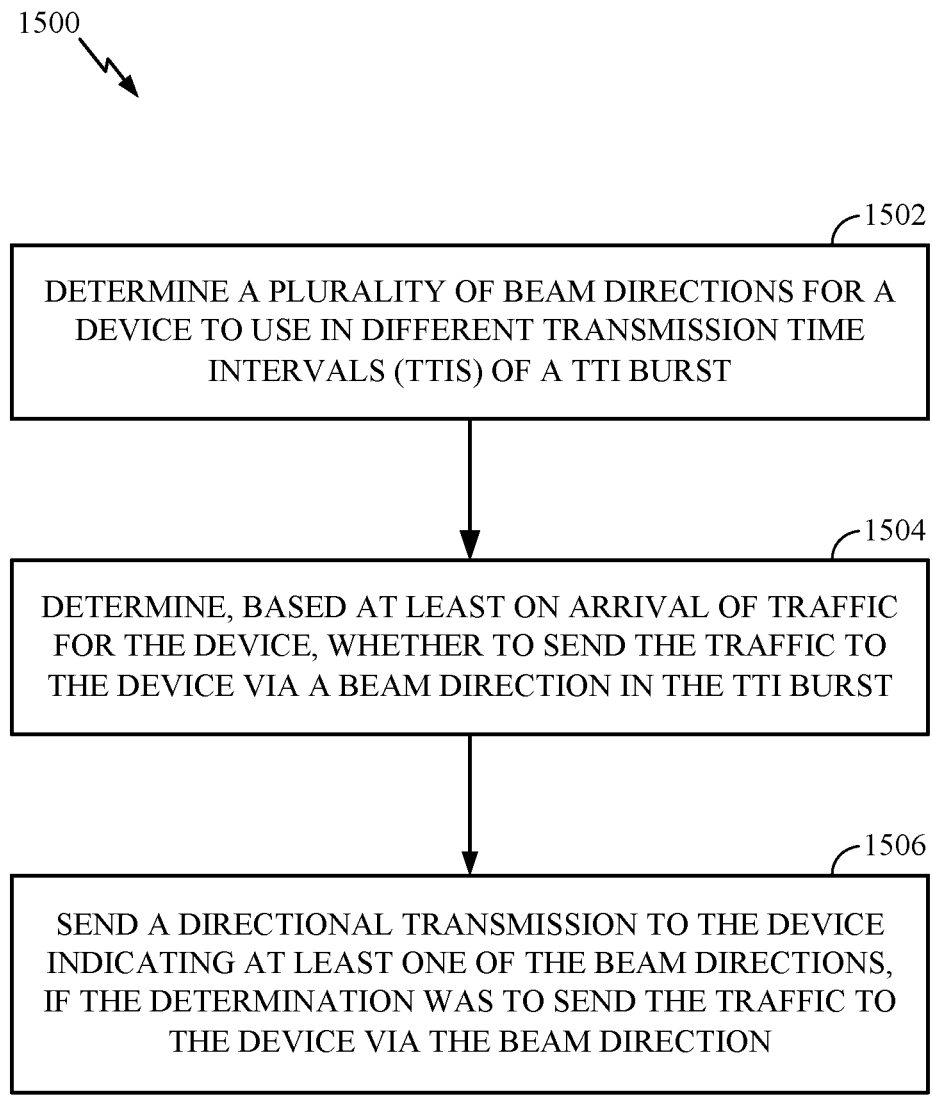
FIG. 15 illustrates example operations that may be performed by an apparatus, according to aspects of the present disclosure.
Figure 16:
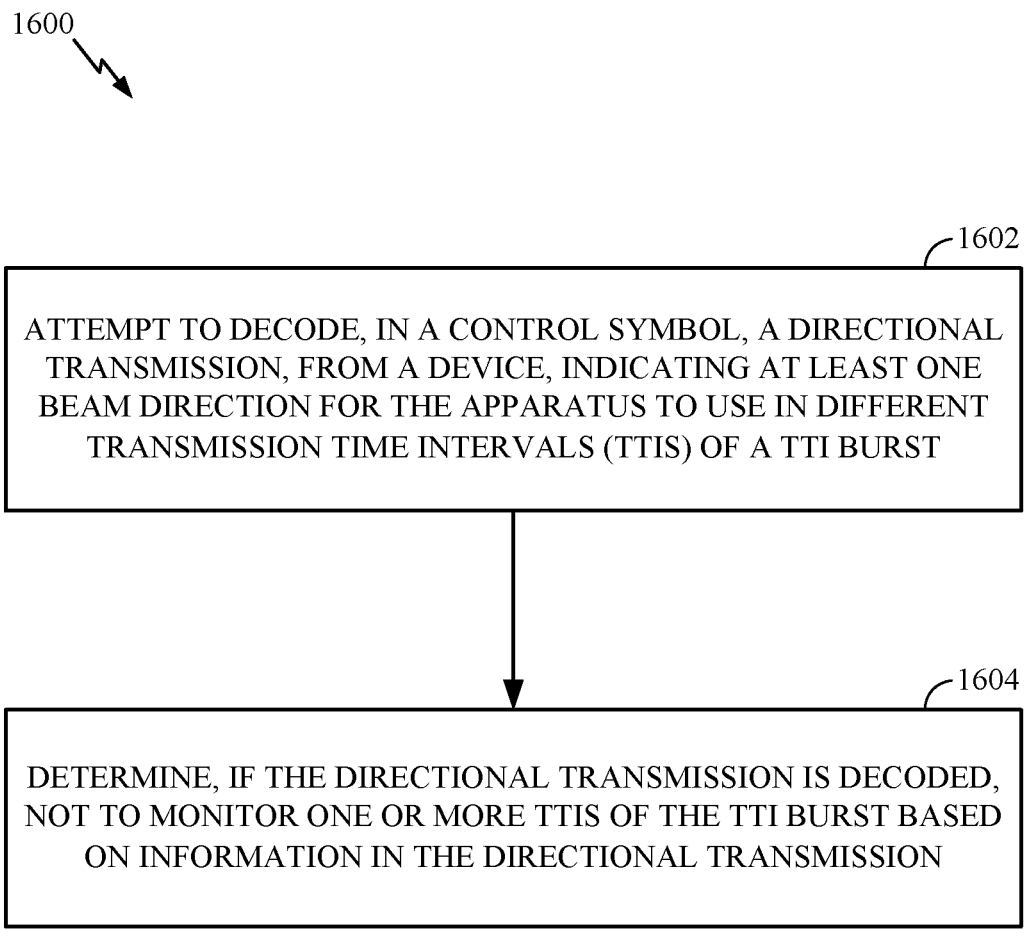
FIG. 16 illustrates example operations that may be performed by an apparatus, according to aspects of the present disclosure.

The BS 110 may be configured to perform the operations 1400, 1500, and 1600, shown in FIGS. 14, 15, and 16. The UE 120 (e.g., UE 120a) also may be configured to perform the operations 1400, 1500, and 1600, shown in FIGS. 14, 15, and 16. Furthermore, the BS 110a and the UE 120a may be configured to perform other aspects described herein. The BS may comprise and/or include a transmission reception point (TRP).

The system illustrated in FIG. 1 may be, for example, a long term evolution (LTE) network. The wireless network 100 may include a number of Node Bs e.g., evolved Node Bs (eNodeBs or eNBs) or 5G Node Bs, 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
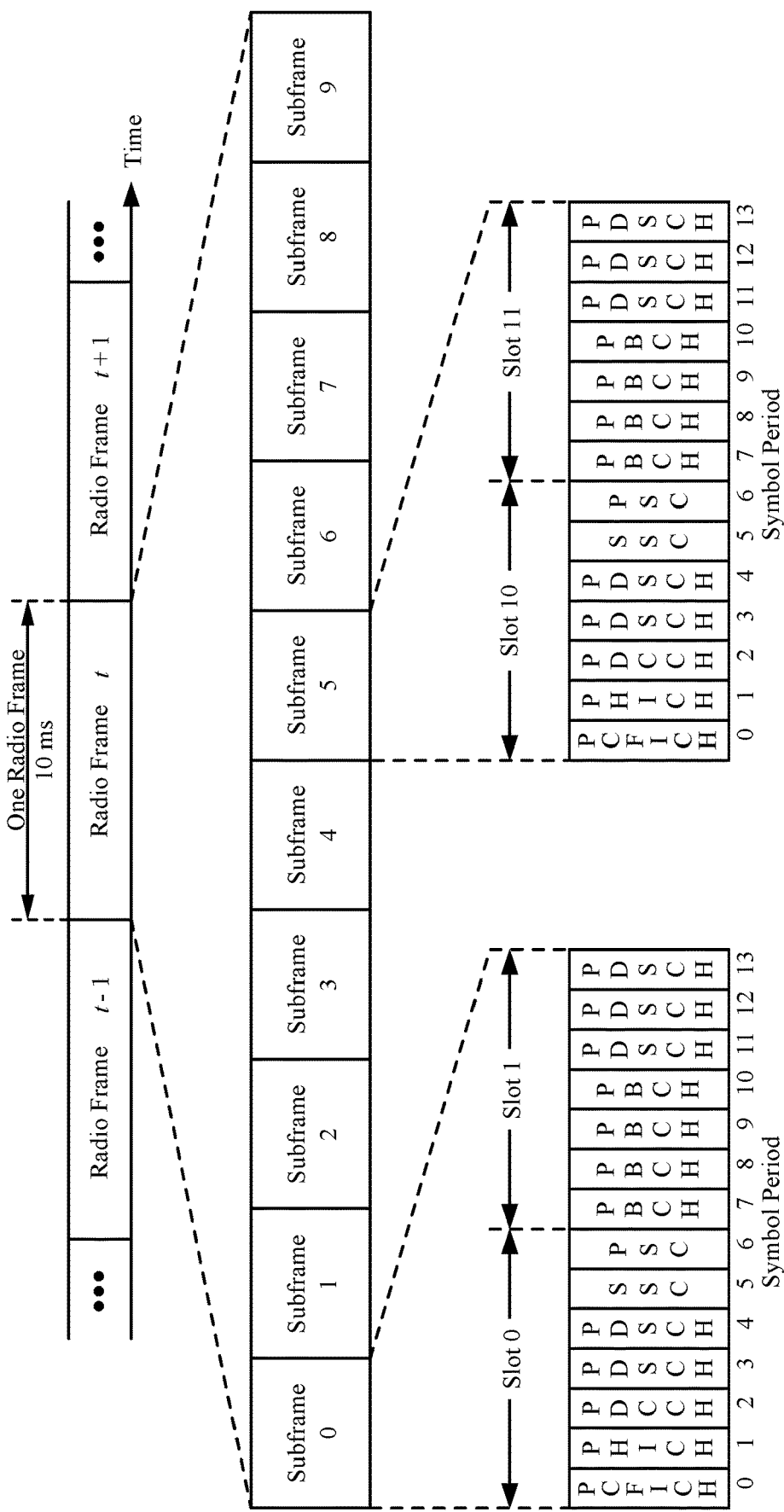
FIG. 2 is a block diagram conceptually illustrating an example downlink frame structure in a telecommunications system, according to aspects of the present disclosure.

FIG. 2 shows a downlink (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
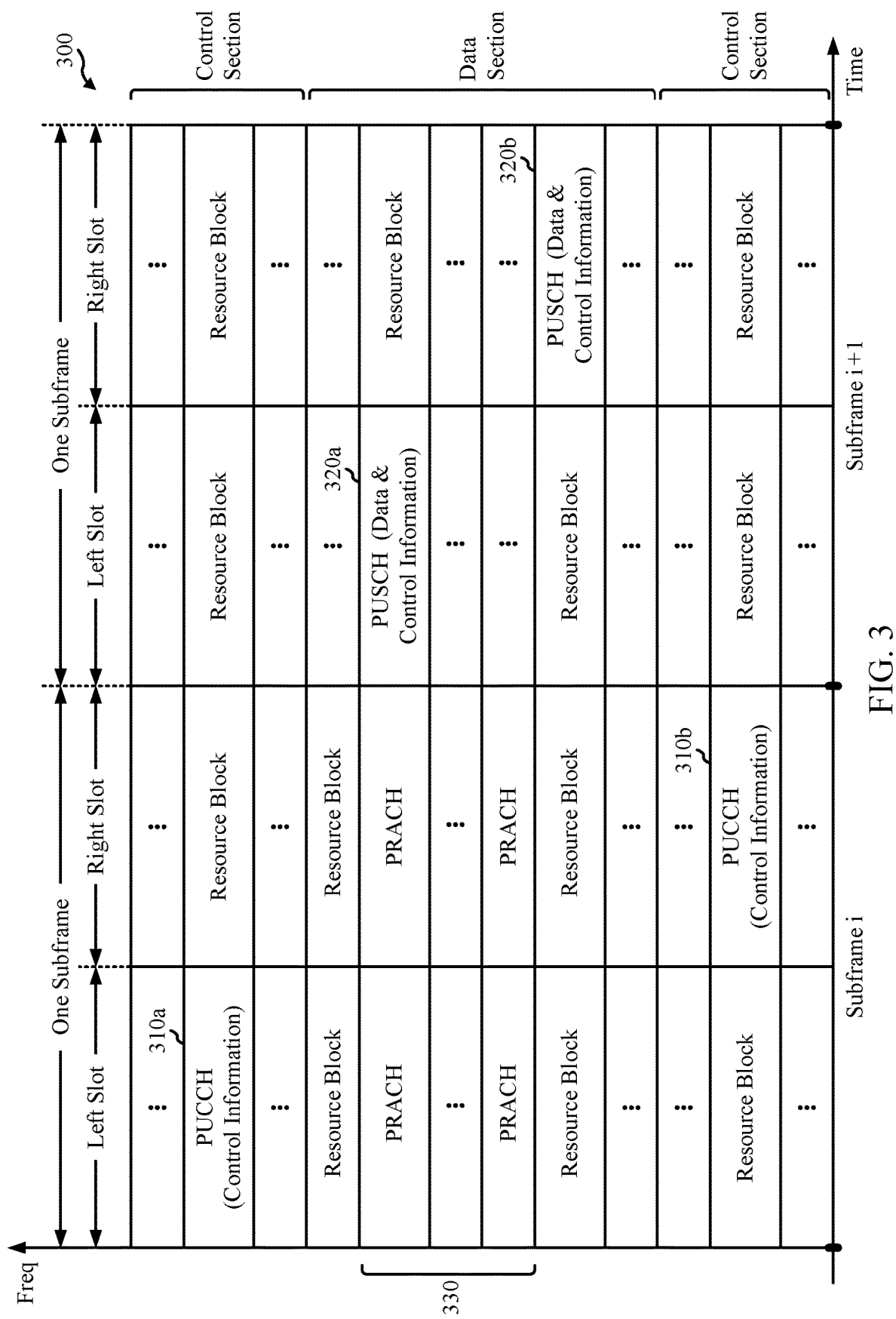
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310*a*, 310*b* in the control section to transmit control information to a Node B. The UE may also be assigned resource blocks 320*a*, 320*b* in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
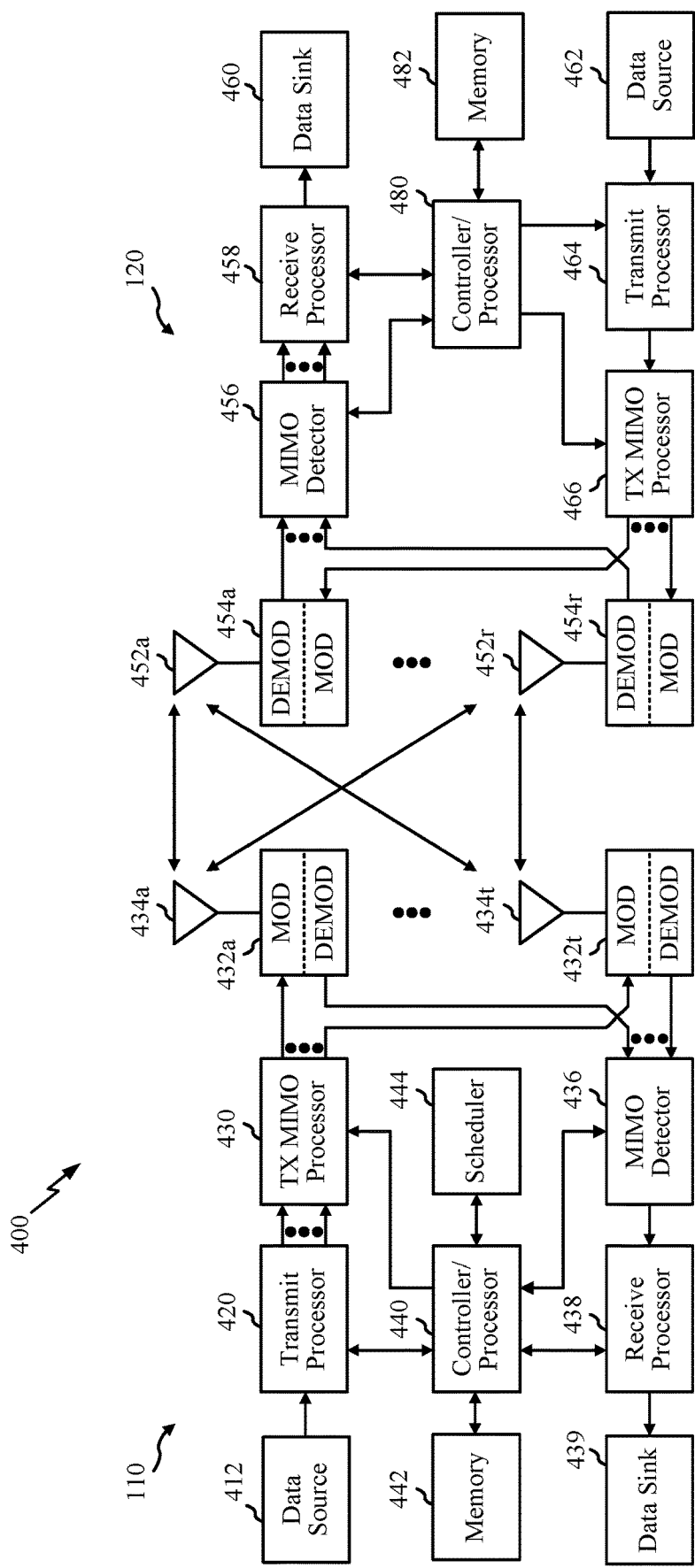
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 14-16. The BS 110 may comprise a TRP. As illustrated, the BS/TRP 110 and UE 120 may communicate using tone alignment and/or RB definition in a heterogeneous numerology system.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. The transmit processor 420, TX MIMO processor 430, modulators 432a-432t, and antennas 434a-434t may be collectively referred to as a transmit chain of the base station.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. The receive processor 458, MIMO detector 456, demodulators 454a-454r, and antennas 452a-452t may be collectively referred to as a receive chain of the UE.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. The transmit processor 464, TX MIMO processor 466, modulators 454a-454r, and antennas 452a-452r may be collectively referred to as a transmit chain of the UE. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440. The receive processor 438, MIMO detector 436, demodulators 432a-432t, and antennas 434a-434t may be collectively referred to as a receive chain of the base station.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 18-21, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
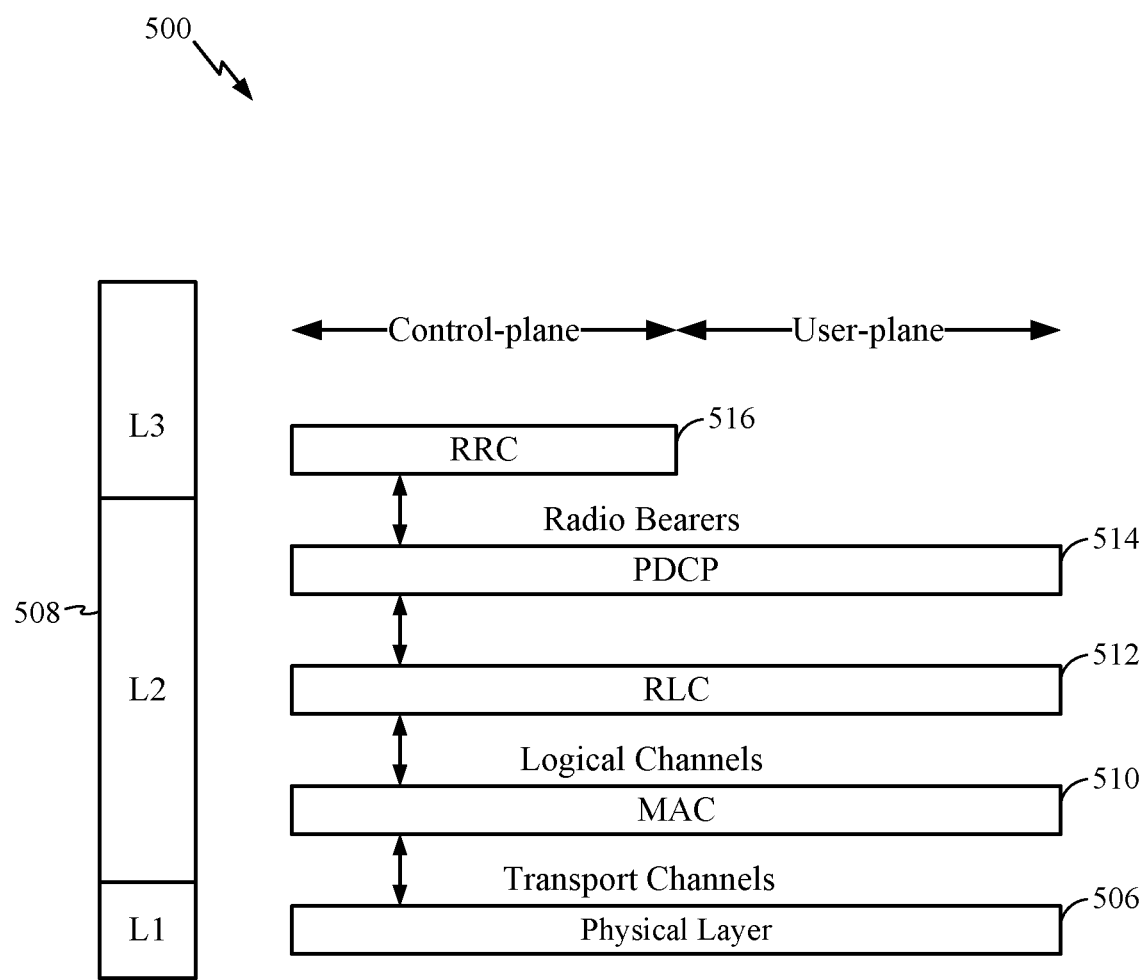
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
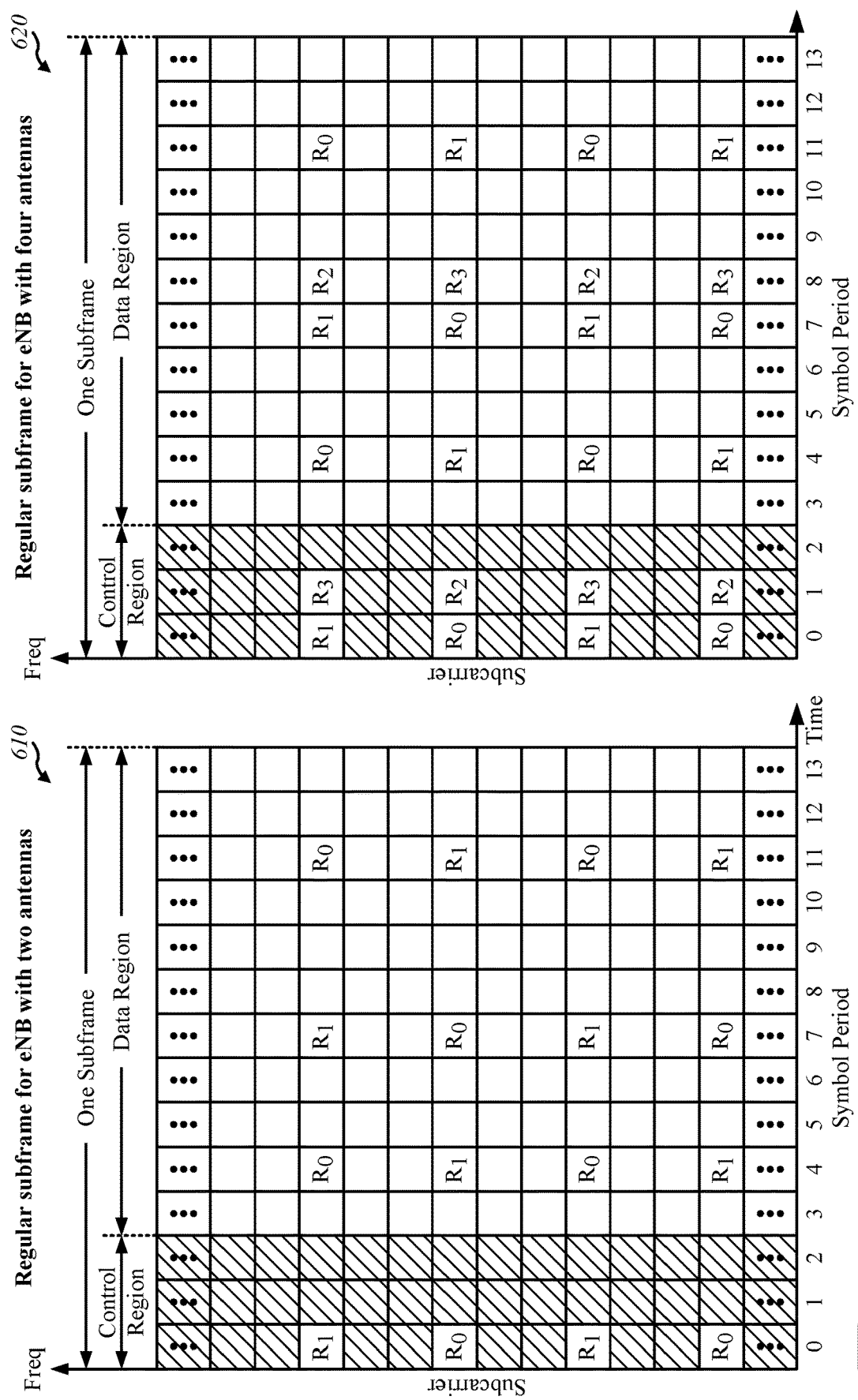
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q$\epsilon${0, . . . , Q−1}.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

New radio (NR) may refer to radios configured to operate according a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a Distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Heterogeneous numerology wireless communication systems may refer to systems in which UEs may be asynchronous, have different intercarrier spacing and/or have different cyclic prefix lengths. According to aspects of the present disclosure, tones for different numerologies may be aligned. A numerology may be based on a subcarrier spacing and a tone shift. As described herein, regardless of the numerology, the tones from the heterogeneous numerology wireless systems may be frequency-aligned.

Example Transmission of a Common Control in a Beamforming System

According to aspects of the present disclosure, in a beamforming system, a broadcast signal transmitted in a particular direction (e.g., from a BS) may only reach a subset of UEs or other devices. For dynamic TDD operation, a transmitter may transmit a slot or frame format indicator to indicate a slot or frame structure for the next N slots or subframes. However, multiple users (e.g., UEs, BSs) may be scheduled in the N slots or subframes, and the users may share the transmission resources (e.g., the available frequencies for the N slots or subframes) in either a time division multiplexing (TDM) manner, a frequency division multiplexing (FDM) manner, or a spatial multiplexing manner, like multi-user multiple-input multiple-output (MU-MIMO). Those users may have different beamforming or beam pairing association(s) with a transmitter, such as an eNB or a next generation Node B (gNB). The transmitter (e.g., a BS, an eNB, a gNB) may transmit the slot or frame format indicator in one or a few OFDM symbols at the beginning of the N slots or subframes or in an additional transmission during those N slots/subframes. For non-beamforming systems, transmitting one such indicator (e.g., broadcast to all devices in range) may be sufficient to indicate a slot or frame structure, for the next N slots or subframes, to all devices in range.

Figure 7:
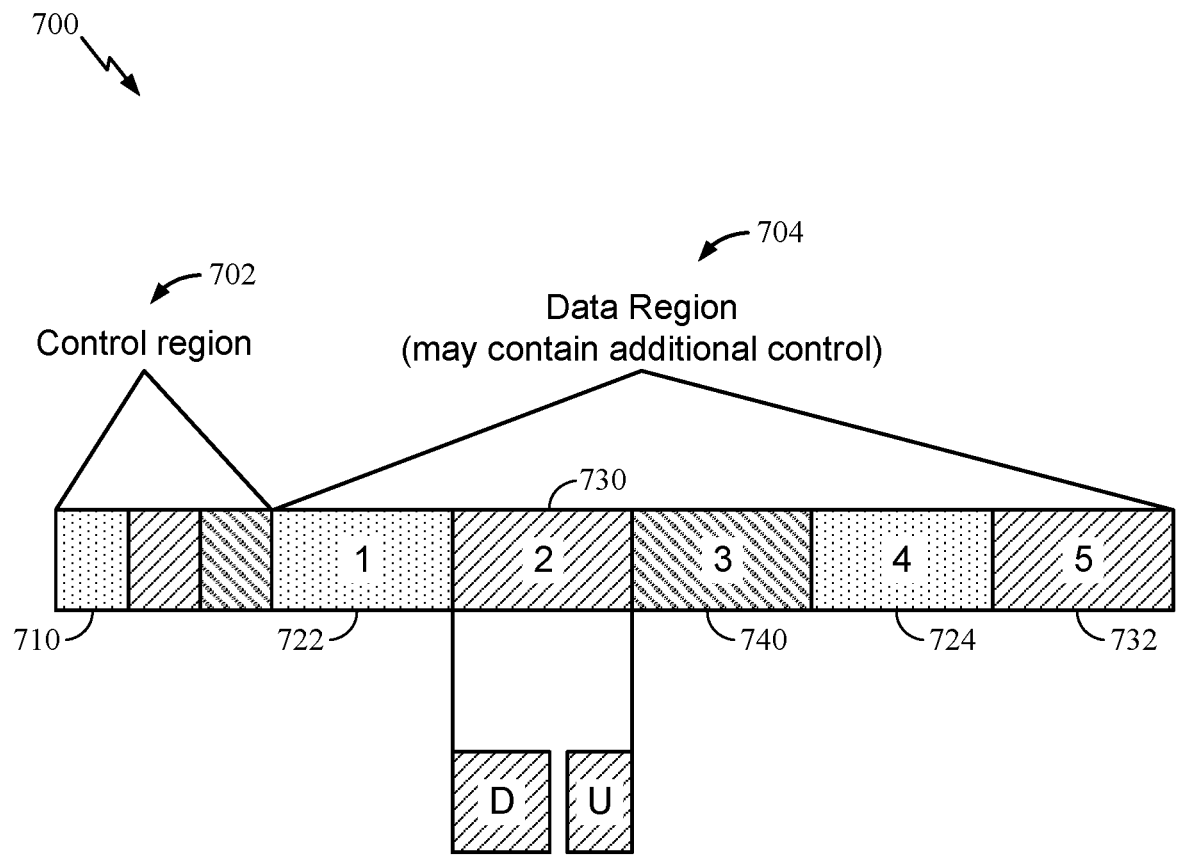
FIG. 7 illustrates an exemplary transmission timeline, according to aspects of the present disclosure.

FIG. 7 illustrates an exemplary transmission timeline 700, according to aspects of the present disclosure. An exemplary control region 702 includes three control symbols that are transmitted by an apparatus (e.g., by BS 110a in FIG. 1) to indicate beams used in five transmission time intervals (TTIs) (e.g., slots, sub-slots, or subframes) in a data region 704. The data region may contain additional control information. Each of the control symbols indicates beams used by the apparatus for one or multiple TTIs for one direction. For example, BS 110a transmits the control symbol 710 to transmit control for one direction, and the control symbol indicates a beam used for transmission by the BS in TTIs 722 and 724 in the exemplary timeline. In the exemplary timeline, the control symbols at 702 can be part of the first TTI (e.g., TTI 722 in the exemplary timeline).

According to aspects of the present disclosure, each TTI (e.g., TTIs 722, 724, 730, 732, 740, shown in FIG. 7) may have a different downlink to uplink configuration. For example, TTI 730 can be an uplink-centric (UL-centric) subframe while TTIs 722, 732, 724, and 740 are downlink or downlink-centric (DL-centric) subframes. Downlink-centric subframes may include an uplink portion, while uplink-centric subframes may include a downlink portion.

Figure 8:
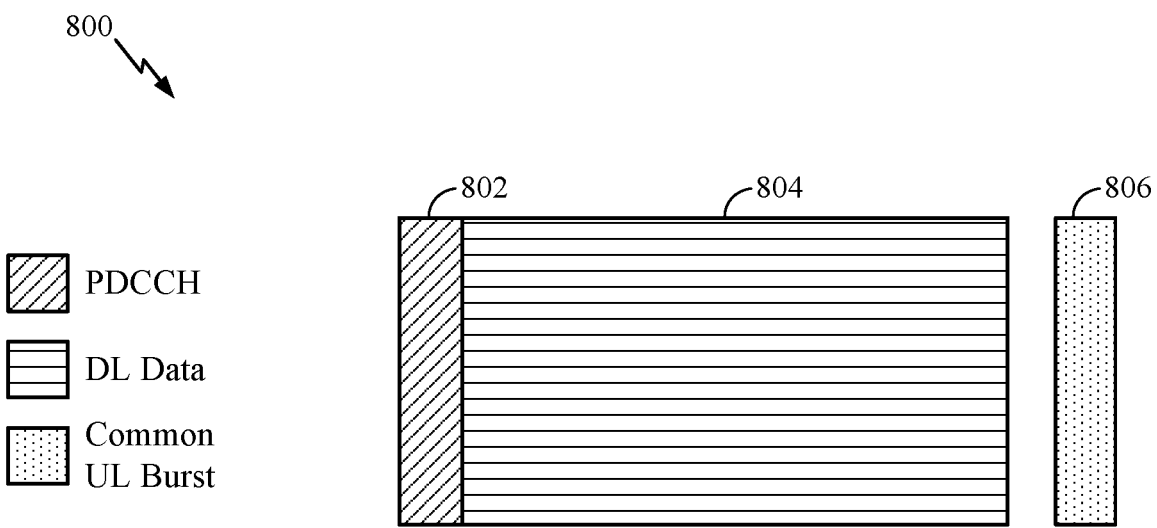
FIG. 8 illustrates an example of a downlink-centric subframe, in accordance with certain aspects of the present disclosure.

FIG. 8 is a diagram 800 showing an example of a DL-centric subframe, which may be used to communicate in the wireless network 100. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical downlink control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 9:
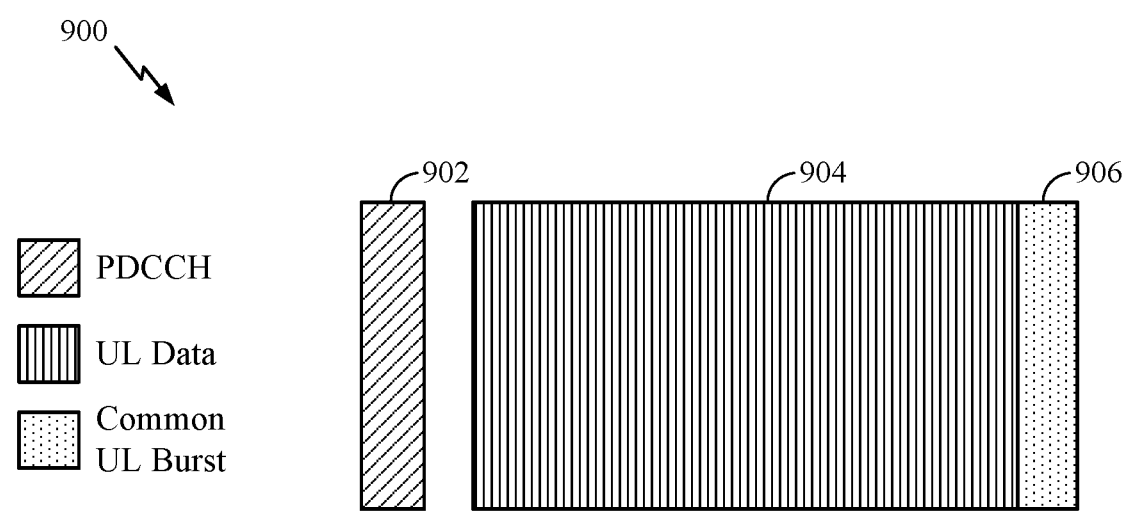
FIG. 9 illustrates an example of an uplink-centric subframe, in accordance with certain aspects of the present disclosure.

FIG. 9 is a diagram 900 showing an example of an UL-centric subframe, which may be used to communicate in the wireless network 100. The UL-centric subframe may include a control portion 902. The control portion 902 may exist in the initial or beginning portion of the UL-centric subframe. The control portion 902 in FIG. 9 may be similar to the control portion described above with reference to FIG. 8. The UL-centric subframe may also include an UL data portion 904. The UL data portion 904 may sometimes be referred to as the payload of the UL-centric subframe. The UL portion may refer to the communication resources utilized to communicate UL data from a subordinate entity (e.g., UE) to a scheduling entity (e.g., UE or BS). In some configurations, the control portion 902 may be a physical DL control channel (PDCCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switch-over from DL communication (e.g., transmission operation by the scheduling entity) to UL communication (e.g., reception by the scheduling entity). The UL-centric subframe may also include a common UL portion 906. The common UL portion 906 in FIG. 9 may be similar to the common UL portion 806 described above with reference to FIG. 8. The common UL portion 806 may additionally or alternatively include information pertaining to a channel quality indicator (CQI), sounding reference signals (SRSs), and various other suitable types of information. One of ordinary skill in the art will understand that while foregoing is merely one example of an UL-centric subframe and alternative structures having similar features may exist without necessarily deviating from the aspects described herein.

Figure 10:
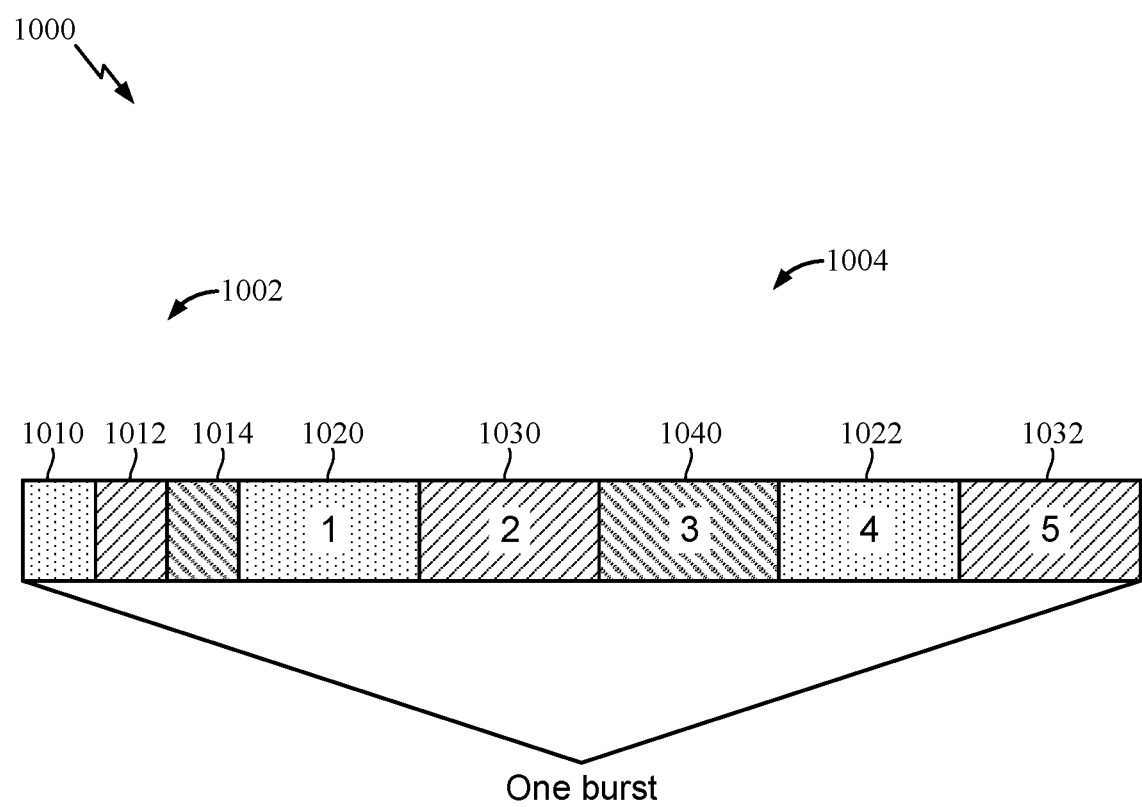
FIG. 10 illustrates an exemplary transmission timeline, according to aspects of the present disclosure.

FIG. 10 illustrates an exemplary transmission timeline 1000, according to aspects of the present disclosure. In the exemplary timeline, an indicator is transmitted by an apparatus (e.g., by BS 110a in FIG. 1), in each control symbol 1010, 1012, 1014 in a control region 1002, and used to indicate beams used by the apparatus in five transmission time intervals (TTIs) (e.g., slots, sub-slots, or subframes) 1020, 1022, 1030, 1032, 1040 in a data region 1004. The data region may contain additional control information. The control region and TTIs may collectively be referred to as a TTI burst or a burst.

According to aspects of the present disclosure, an indicator such as those transmitted in the control symbols 1010, 1012, and 1014 may include one or a combination of pieces of information. One piece of information the indicator may include is a beam direction indicator, where, for N TTIs (e.g., slots or subframes), the apparatus may have a capability to indicate M directions, where M<=N (e.g., a beam direction indicator may be capable of indicating one of three directions, and a BS may use the beam direction indicator for a period of five TTIs). Another piece of information the indicator may include is downlink and/or uplink split information for one or more of the TTIs. Yet another piece of information the indicator may include is a duration of the burst (e.g., a number of slots or a number of subframes). Other pieces of information the indicator may include are numerology parameters (e.g., tone spacing and/or CP duration) used by the apparatus in the burst, where multiple numerologies may be used in the burst. Still other information that the indicator may include is an indication that one or more uplink control regions (considering the control region 1002 as a downlink control region) are scheduled in one or more of the TTIs (e.g., slots or subframes) in the burst.

Figure 11:
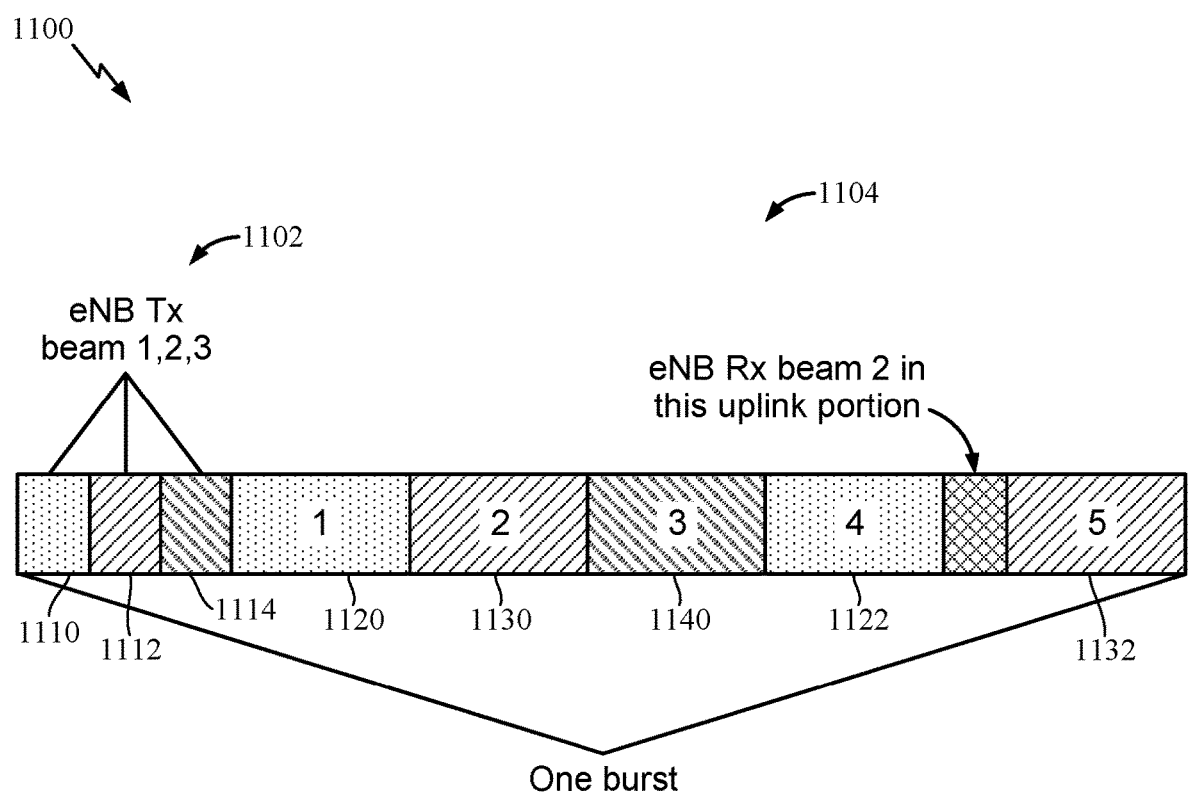
FIG. 11 illustrates an exemplary transmission timeline, according to aspects of the present disclosure.

FIG. 11 illustrates an exemplary transmission timeline 1100, according to aspects of the present disclosure. In the exemplary timeline, an indicator is transmitted by an apparatus (e.g., by BS 110a in FIG. 1), in each control symbol 1110, 1112, and 1114 in a control region 1102, and used to indicate beams used by the apparatus in five transmission time intervals (TTIs) (e.g., slots or subframes) 1120, 1122, 1130, 1132, and 1140 in a data region 1104. The data region may contain additional control information. The control region and TTIs may collectively be referred to as a TTI burst or a burst.

According to aspects of the present disclosure, the indicator may indicate one or a combination of pieces of information. A first piece of information the indicator may include is receive beam information for the transmitting apparatus for an uplink portion (considering transmissions by the transmitting device to be downlink) in the burst. A specific beam index may be signaled such that a receiving device knows that the transmitting apparatus will prepare a receive beam (of the transmitting apparatus) in a specific direction at a specific time in the burst. This may enable a device receiving the indicator to transmit to the apparatus transmitting the indicator using a beam matching the indicated receive beam at the indicated time. For example, an eNB (e.g., eNB 110*a* in FIG. 1) transmits an indicator of three directions 1, 2, and 3 in a downlink transmission. In the example, the eNB prepares a receive beam for the eNB to receive in direction 2 at the end of TTI (e.g., slot or subframe) 4. In the example, the eNB preparing and indicating the receive beam may enable a UE (e.g., UE 120*a* in FIG. 1), which is located in a direction from the eNB that corresponds to the receive beam, to autonomously (e.g., without being scheduled by the eNB) transmit to the eNB in another (e.g., higher) frequency, because the UE knows from the indicator that the eNB is ready to receive in a direction corresponding to the UE. In aspects of the present disclosure, a UE may transmit a beam recovery signal using the advertised information, where beam recovery means the UE may have lost an existing active beam pair to a serving gNB, and the UE is trying to signal to the gNB that a new beam direction has been identified and that the new beam direction matches with the advertised receive beam direction.

Figure 12:
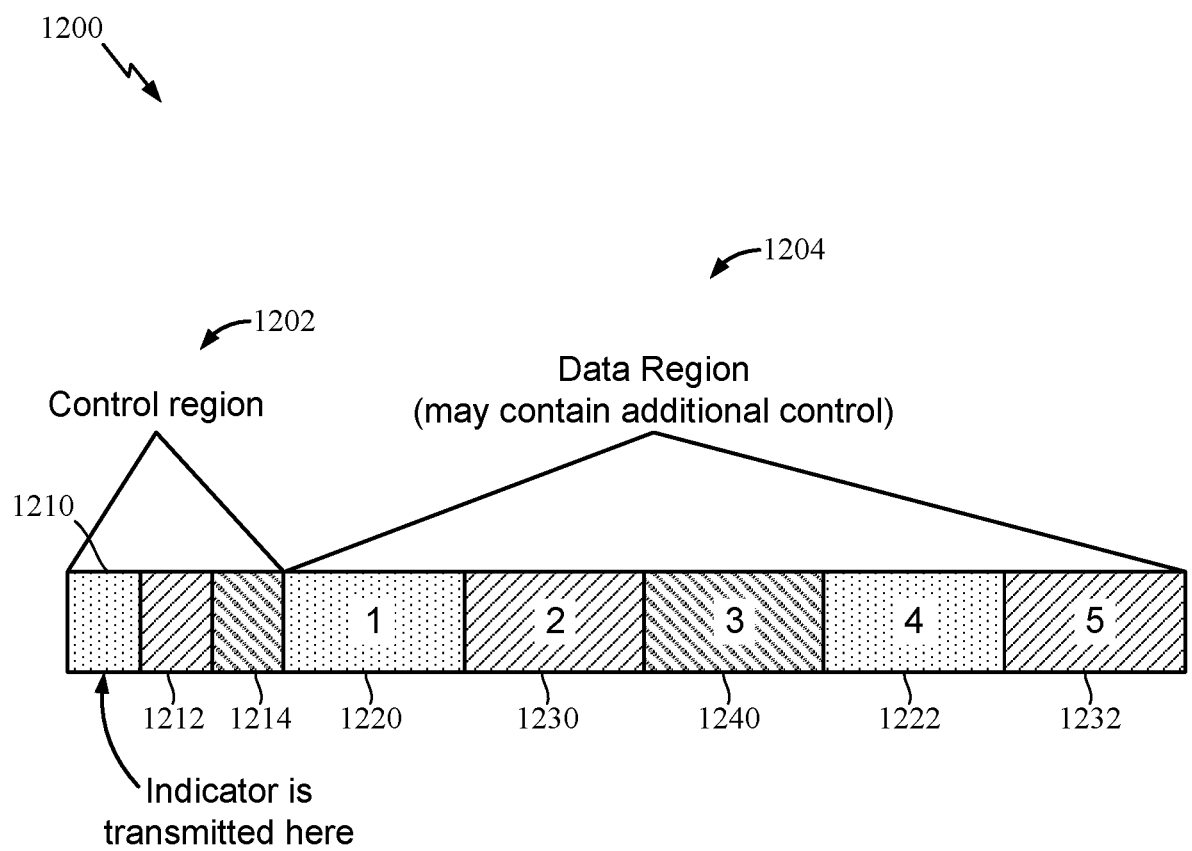
FIG. 12 illustrates an exemplary transmission timeline, according to aspects of the present disclosure.

FIG. 12 illustrates an exemplary transmission timeline 1200, according to aspects of the present disclosure. In the exemplary timeline, an indicator is transmitted by an apparatus (e.g., by BS 110*a* in FIG. 1), in a first control symbol 1210 of a control region 1202 including two other control symbols 1212, 1214, and used to indicate beams used by the apparatus in five transmission time intervals (TTIs) (e.g., slots or subframes) 1220, 1222, 1230, 1232, 1240 in a data region 1204. The data region may contain additional control information. The control region and TTIs may collectively be referred to as a TTI burst or a burst. According to aspects of the present disclosure, the indicator may be transmitted in a broadcast manner, such that any device within range of the apparatus can receive it and determine beams to be used by the transmitting apparatus.

Figure 13:
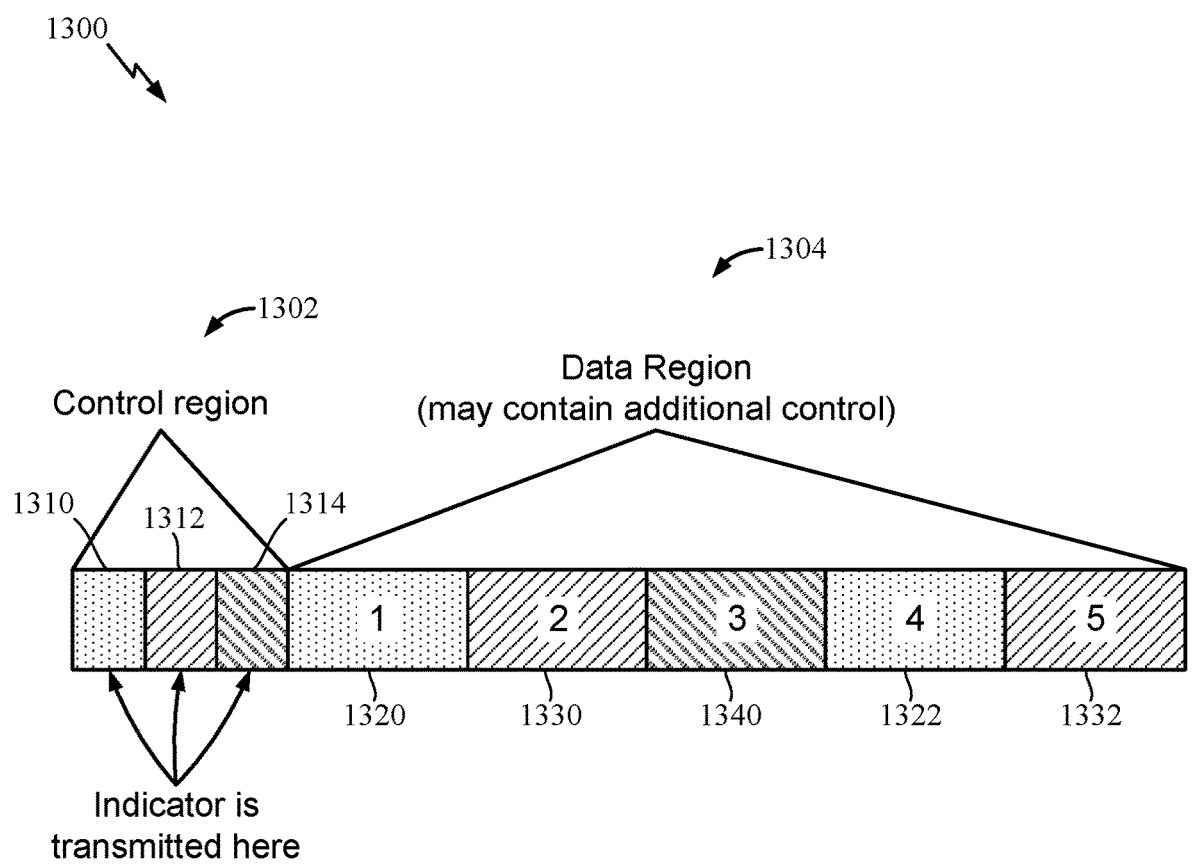
FIG. 13 illustrates an exemplary transmission timeline, according to aspects of the present disclosure.

FIG. 13 illustrates an exemplary transmission timeline 1300, according to aspects of the present disclosure. In the exemplary timeline, an indicator is transmitted by an apparatus (e.g., by BS 110*a* in FIG. 1), in a directional manner (e.g., via a beam) in each control symbol 1310, 1312, 1314 of a control region 1302 and used to indicate beams used by the apparatus in five transmission time intervals (TTIs) (e.g., slots or subframes) 1320, 1322, 1330, 1332, 1340 in a data region 1304. The data region may contain additional control information. The control region and TTIs may collectively be referred to as a TTI burst or a burst.

According to aspects of the present disclosure, the indicator may be transmitted in each beam direction by being repeated in each control symbol 1310, 1312, 1314, and each control symbol may be transmitted using the corresponding beam direction.

According to aspects of the present disclosure, the indicator may be scrambled, with the scrambling based on a control symbol index of the control symbol in which the indicator is transmitted.

According to aspects of the present disclosure, each indicator may be transmitted on frequency resources selected based on a control symbol index of the control symbol in which the indicator is transmitted.

According to aspects of the present disclosure, an indicator may be direction specific, with the indicator indicating only a beam or beams that are used when transmitting the indicator.

According to aspects of the present disclosure, the indicator may be UE specific, with the indicator indicating only a beam corresponding to (e.g., receivable by) a UE or other device in one direction from the apparatus.

According to aspects of the present disclosure, the indicator may be group specific, with the indicator indicating only a beam corresponding to (e.g., receivable by) a group of UEs or other devices in one direction from the apparatus.

According to aspects of the present disclosure, the indicator described in FIG. 13 may be transmitted in each symbol of the control region by being jointly encoded over the symbols in the control region. Specific resources (e.g. frequency resources) may be reserved in all or a subset of a control region, and after encoding, the indicator may be mapped to those resources. From a symbol index of a control symbol, a receiving device (e.g., a UE) can derive the coded bits, and thus, using one or a subset of symbols, the receiving device can decode the indicator.

According to aspects of the present disclosure, the indicators described above with reference to FIGS. 7 and 10-13 may be transmitted via a layer 1 (e.g. PHY) signal.

According to aspects of the present disclosure, the indicators described above with reference to FIGS. 7 and 10-13 may be transmitted via a control channel (e.g., a PDCCH).

According to aspects of the present disclosure, the indicators described above with reference to FIGS. 7 and 10-13 may be transmitted by an apparatus (e.g., eNB 110*a* shown in FIG. 1) and activated and/or deactivated by the apparatus. That is, an apparatus may send an indicator that a beam will be used in a TTI and later send a signal (e.g., a control channel) indicating that the beam will not actually be used during part or all of that TTI. A device (e.g., UE 120*a* shown in FIG. 1) receiving such an indicator and signal may determine that the beam is not intended for the device and not monitor a TTI or portion of the TTI if the apparatus signals that the indicator is activated. If the apparatus signals that the indicator is deactivated, then the device may monitor the corresponding TTI or portion of the TTI, because the apparatus may transmit a signal that the device can receive.

According to aspects of the present disclosure, an apparatus (e.g., eNB 110*a* shown in FIG. 1) may send an indicator and then determine not to use the indicated beams and also determine not to transmit a signal indicating the indicator is deactivated. For example, the apparatus may determine to schedule only non-beamformed transmissions intended for devices that monitor regardless of what the indicator indicates during the burst, and the apparatus may then transmit broadcast transmissions during the burst.

According to aspects of the present disclosure, an apparatus (e.g., eNB 110*a* shown in FIG. 1) may signal to one or more other devices (e.g., UE 120*a* shown in FIG. 1) that the apparatus may use such an indicator, as described above. The other devices may determine to monitor for the indicator and, upon receiving an indicator, the other device may determine when to monitor for beamformed transmissions from the apparatus.

According to aspects of the present disclosure, an apparatus (e.g., eNB 110*a* shown in FIG. 1) may determine not to transmit an indicator as described above.

As previously mentioned an indicator can be transmitted via a layer 1 signal or via a control channel. According to aspects of the present disclosure, a receiving device (e.g., UE 120*a* shown in FIG. 1) may attempt to decode such an indicator in each potential control symbol. Once decoded, a receiving device may determine not to monitor some of the TTIs (e.g., slots or subframes) based on the decoded information carried in the indicator. For example, a device receiving the transmissions shown in transmission timeline 1300 in FIG. 13 may determine that the device cannot receive any beam indicated in TTI 1340 and, based on that determination, determine not to monitor for transmissions from an apparatus during TTI 1340.

According to aspects of the present disclosure, a receiving device (e.g., UE 120*a* shown in FIG. 1) may, if the device is unable to decode any indicator, determine to monitor each TTI (e.g., slot or subframe) for a control channel that may schedule transmissions for the receiving device.

FIG. 14 illustrates example operations 1400 that may be performed by an apparatus, according to aspects of the present disclosure. The apparatus may be BS 110*a* or UE 120*a* in FIG. 1, which may include one or more components illustrated in FIG. 4.

Operations 1400 begin at 1402 with the apparatus determining a plurality of beam directions for a device to use in different transmission time intervals (TTIs) of a TTI burst. For example, BS 110*a* may determine a set of three beam directions for UE 120*a* to use in five TTIs of a TTI burst, such as the TTI 1000 burst shown in FIG. 10. In the example, the beam of TTIs 1 and 4 may point in the direction of UE 120*a*.

At 1404, the apparatus sends a directional transmission to the device indicating at least one of the beam directions. The directional transmission may comprise, for example, one or more of the indicators described above with reference to FIGS. 7 and 10-13. Continuing the example from above, BS 110*a* may send a directional transmission to UE 120*a* (e.g., using the beams to be used during TTIs 1 and 4) indicating that the BS will use a beam with a direction matching the direction to UE 120*a* during TTIs 1 and 4 of the TTI burst.

FIG. 15 illustrates example operations 1500 that may be performed by an apparatus, according to aspects of the present disclosure. The apparatus may be BS 110*a* or UE 120*a* in FIG. 1, which may include one or more components illustrated in FIG. 4.

Operations 1500 begin at 1502 with the apparatus determining a plurality of beam directions for a device to use in different transmission time intervals (TTIs) of a TTI burst. For example, BS 110*a* may determine a set of three beam directions for UE 120*a* to use in five TTIs of a TTI burst, such as the TTI 1000 burst shown in FIG. 10. In the example, the beam of TTIs 1 and 4 may point in the direction of UE 120*a*.

At 1504, the apparatus determines, based at least on arrival of traffic for the device, whether to send the traffic to the device via a beam direction in the TTI burst. Continuing the example from above, BS 110*a* may receive traffic for UE 120*a* and determine to send the traffic to UE 120*a* using the beams the BS determined to use in TTIs 1 and 4, because the BS is aware that those beams are in a direction matching the direction to UE 120*a*.

At 1506, the apparatus sends a directional transmission to the device indicating at least one of the beam directions, if the determination was to send the traffic to the device via the beam direction. The directional transmission may comprise, for example, one or more of the indicators described above with reference to FIGS. 7 and 10-13. Continuing the example from above, BS 110*a* may send a directional transmission to UE 120*a* (e.g., using the beams to be used during TTIs 1 and 4) indicating that the BS will use a beam with a direction matching the direction to UE 120*a* during TTIs 1 and 4 of the TTI burst.

FIG. 16 illustrates example operations 1600 that may be performed by an apparatus, according to aspects of the present disclosure. The apparatus may be BS 110*a* or UE 120*a* in FIG. 1, which may include one or more components illustrated in FIG. 4.

Operations 1600 begin at 1602 with the apparatus attempting to decode, in a control symbol, a directional transmission, from a device, indicating at least one beam direction for the apparatus to use in different transmission time intervals (TTIs) of a TTI burst. For example, UE 120*a* may attempt to decode a directional transmission from BS 110*a*, in a control symbol (e.g., control symbol 1010 shown in FIG. 10), wherein the directional transmission indicates that the BS will use a beam with a direction not matching the direction to the UE in TTIs 1 and 4 of a TTI burst, such as TTI burst 1000 shown in FIG. 10.

At 1604, the apparatus determines, if the directional transmission is decoded, not to monitor one or more TTIs of the TTI burst based on information in the directional transmission. The directional transmission may comprise, for example, one or more of the indicators described above with reference to FIGS. 7 and 10-13. Continuing the example from above, the UE may determine not to monitor TTIs 1 and 4 of the TTI burst 1000, because the UE successfully decoding the control symbol 1010 and determined that transmissions in TTIs 1 and 4 will be on beams that do not match the direction from the BS to the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by an apparatus, comprising:
    attempting to decode, in a control symbol, a directional transmission, from a device, indicating at least one beam direction for different transmission time intervals (TTIs) of a TTI burst; and
    determining, when the directional transmission is decoded, not to monitor one or more TTIs of the TTI burst based on information in the directional transmission.

2. The method of claim 1, further comprising:
    determining to transmit a transmission to the device, when the directional transmission is decoded and when the directional transmission indicates the device will receive on a beam corresponding to the apparatus.

3. The method of claim 1, wherein the directional transmission further indicates at least one of a downlink to uplink split of the TTI burst, a duration of the TTI burst, or an uplink control region of at least one TTI of the TTI burst.

4. The method of claim 1, wherein the directional transmission indicates at least one numerology parameter used in the TTI burst.

5. The method of claim 4, wherein the at least one numerology parameter comprises at least one of tone spacing or cyclic prefix (CP) length.

6. The method of claim 1, wherein each TTI of the TTI burst comprises a plurality of subframes.

7. The method of claim 1, wherein each TTI of the TTI burst comprises a plurality of slots or sub-slots.

8. The method of claim 1, wherein the directional transmission further indicates the device will receive on the at least one of the beam directions during a TTI, a slot, or a sub-slot of the TTI burst.

9. The method of claim 8, further comprising:
    transmitting a signal to the device or another device via one of the indicated at least one of the beam directions.

10. The method of claim 9, further comprising:
    configuring a receive chain of the apparatus to receive via one of the indicated at least one of the beam directions.

11. The method of claim 1, wherein the control symbol has an index; and the method further comprises:
    descrambling the directional transmission based on the index.

12. The method of claim 1, further comprising:
    communicating with the device via an active transmit and receive beam pair prior to receiving the directional transmission; and
    receiving an indication that the device has lost the existing transmit and receive beam pair, wherein the directional transmission comprises a beam recovery signal.

13. The method of claim 1, further comprising:
    receiving the directional transmission via a layer 1 signal.

14. The method of claim 1, further comprising:
    receiving the directional transmission via a control channel.

15. The method of claim 1, further comprising:
    transmitting another directional transmission to the device on one of the beam directions.

16. An apparatus for wireless communications, comprising:
    a processing system configured to:
        attempt to decode, in a control symbol, a directional transmission, from a device, indicating at least one beam direction for different transmission time intervals (TTIs) of a TTI burst; and
        determine, when the directional transmission is decoded, not to monitor one or more TTIs of the TTI burst based on information in the directional transmission; and
    a memory coupled with the processing system.

17. The apparatus of claim 16, wherein the processing system is further configured to: determine to transmit a transmission to the device, when the directional transmission is decoded and when the directional transmission indicates the device will receive on a beam corresponding to the apparatus.

18. The apparatus of claim 16, wherein the directional transmission further indicates at least one of a downlink to uplink split of the TTI burst, a duration of the TTI burst, or an uplink control region of at least one TTI of the TTI burst.

19. The apparatus of claim 16, wherein the directional transmission indicates at least one numerology parameter used in the TTI burst.

20. The apparatus of claim 19, wherein the at least one numerology parameter comprises at least one of tone spacing or cyclic prefix (CP) length.

21. The apparatus of claim 16, wherein each TTI of the TTI burst comprises a plurality of subframes.

22. The apparatus of claim 16, wherein each TTI of the TTI burst comprises a plurality of slots or sub-slots.

23. The apparatus of claim 16, wherein the directional transmission further indicates the device will receive on the at least one of the beam directions during a TTI, a slot, or a sub-slot of the TTI burst.

24. The apparatus of claim 23, wherein the processing system is further configured to:
    transmit a signal to the device or another device via one of the indicated at least one of the beam directions.

25. The apparatus of claim 24, wherein the processing system is further configured to:
    configure a receive chain of the apparatus to receive via one of the indicated at least one of the beam directions.

26. The apparatus of claim 16, wherein the control symbol has an index; and the processing system is further configured to: descramble the directional transmission based on the index.

27. The apparatus of claim 16, wherein the processing system is further configured to: communicate with the device via an active transmit and receive beam pair prior to receiving the directional transmission; and receive an indication that the device has lost the existing transmit and receive beam pair, wherein the directional transmission comprises a beam recovery signal.

28. The apparatus of claim 16, wherein the processing system is further configured to: receive the directional transmission via a layer 1 signal.

29. The apparatus of claim 16, wherein the processing system is further configured to: receive the directional transmission via a control channel.

30. The apparatus of claim 16, wherein the processing system is further configured to: transmit another directional transmission to the device on one of the beam directions.

* * * * *